United States Patent
Russell, II et al.

(10) Patent No.: US 12,441,625 B2
(45) Date of Patent: Oct. 14, 2025

(54) TITANIUM-MOLYBDATE AND METHOD FOR MAKING THE SAME

(71) Applicant: BWXT Isotope Technology Group, Inc., Lynchburg, VA (US)

(72) Inventors: William Earl Russell, II, Charlotte, NC (US); Earl Brian Barger, Charlotte, NC (US); Benjamin I. Bishop, Charlotte, NC (US); Barbara B. Bohannon, Charlotte, NC (US); Christopher Sean Fewox, Charlotte, NC (US); James B. Inman, Charlotte, NC (US); Erik T. Nygaard, Charlotte, NC (US); Timothy A. Policke, Charlotte, NC (US); Stephen D. Preite, Charlotte, NC (US); Roger D. Ridgeway, Charlotte, NC (US); Steve W. Schilthelm, Charlotte, NC (US); Bryan Blake Wiggins, Charlotte, NC (US)

(73) Assignee: BWXT Isotope Technology Group, Inc., Lynchburg, VA (US)

( * ) Notice: Subject to any disclaimer, the term of this patent is extended or adjusted under 35 U.S.C. 154(b) by 474 days.

(21) Appl. No.: 17/087,284

(22) Filed: Nov. 2, 2020

(65) Prior Publication Data
US 2021/0047199 A1 Feb. 18, 2021

Related U.S. Application Data

(62) Division of application No. 15/902,086, filed on Feb. 22, 2018.

(60) Provisional application No. 62/592,737, filed on Nov. 30, 2017, provisional application No. 62/463,020, filed on Feb. 24, 2017.

(51) Int. Cl.
*C01G 39/00* (2006.01)
*A61K 51/02* (2006.01)

(52) U.S. Cl.
CPC .......... *C01G 39/006* (2013.01); *A61K 51/025* (2013.01); *C01G 39/00* (2013.01); *C01P 2004/60* (2013.01); *C01P 2004/61* (2013.01); *C01P 2006/44* (2013.01)

(58) Field of Classification Search
CPC ..... C01G 39/006; C01G 39/00; A61K 51/025
See application file for complete search history.

(56) References Cited

U.S. PATENT DOCUMENTS

| | | |
|---|---|---|
| 3,056,647 A | 10/1962 | Amphlett |
| 3,140,393 A | 7/1964 | Busch |
| 3,436,354 A | 4/1969 | Molinski et al. |
| 3,607,007 A | 9/1971 | Chiola et al. |
| 3,666,822 A | 5/1972 | Grasselli et al. |
| 3,752,769 A | 8/1973 | Lewis et al. |
| 4,123,497 A | 10/1978 | Ruddock |
| 4,141,861 A | 2/1979 | Courty et al. |
| 4,196,047 A | 4/1980 | Mitchem et al. |
| 4,273,745 A | 6/1981 | Laferty et al. |
| 4,280,053 A * | 7/1981 | Evans ............ G21G 1/04 423/2 |
| 4,360,495 A | 11/1982 | Bauer |
| 4,440,729 A | 4/1984 | Jonsson |
| 4,487,850 A | 12/1984 | Li |
| 4,525,331 A | 6/1985 | Cheresnowsky et al. |
| 4,738,834 A | 4/1988 | Moore et al. |
| 4,756,746 A | 7/1988 | Kemp, Jr. et al. |
| 4,760,638 A | 8/1988 | Ott et al. |
| 4,782,231 A | 11/1988 | Svoboda et al. |
| 5,382,388 A | 1/1995 | Ehrhardt et al. |
| 5,397,902 A | 3/1995 | Castner et al. |
| 5,615,238 A | 3/1997 | Wiencek et al. |
| 5,802,438 A | 9/1998 | Bennett et al. |
| 5,821,186 A | 10/1998 | Collins |
| 5,846,455 A | 12/1998 | David et al. |
| 6,103,295 A | 8/2000 | Chan et al. |
| 6,113,795 A | 9/2000 | Subramaniam et al. |
| 6,136,740 A | 10/2000 | Jones et al. |
| 6,160,862 A | 12/2000 | Wiencek et al. |
| 6,166,284 A | 12/2000 | Oelsner |
| 6,208,704 B1 | 3/2001 | Lidsky et al. |
| 6,394,945 B1 | 5/2002 | Chan et al. |
| 6,638,205 B1 | 10/2003 | Chan et al. |

(Continued)

FOREIGN PATENT DOCUMENTS

| | | |
|---|---|---|
| AR | 009481 A1 | 4/2000 |
| AR | 019754 A1 | 3/2002 |

(Continued)

OTHER PUBLICATIONS

International Search Report and Written Opinion of corresponding International Application PCT/US2018/019335, mailed on May 7, 2018, all enclosed pages cited.

(Continued)

*Primary Examiner* — Michael Forrest
(74) *Attorney, Agent, or Firm* — Nelson Mullins Riley & Scarborough LLP

(57) ABSTRACT

A process for producing a titanium-molybdate material is provided. The process includes a step of reacting a metal molybdenum (Mo) material in a liquid medium with a first acid to provide a Mo composition and combining the Mo composition with a titanium source to provide a Ti—Mo composition. The Ti—Mo composition can be pH adjusted with a base to precipitate a plurality of Ti—Mo particulates.

11 Claims, 7 Drawing Sheets

(56) References Cited

U.S. PATENT DOCUMENTS

| | | |
|---|---|---|
| 6,676,988 B2 | 1/2004 | Chan et al. |
| 6,793,798 B2 | 9/2004 | Chan et al. |
| 8,270,555 B2 | 9/2012 | Hannah et al. |
| 8,318,113 B2 | 11/2012 | Barbosa |
| 8,437,443 B2 | 5/2013 | Russell, II et al. |
| 8,488,733 B2 | 7/2013 | Allen et al. |
| 8,542,789 B2 | 9/2013 | Russell, II et al. |
| 8,569,713 B2 | 10/2013 | Evers |
| 8,638,899 B2 | 1/2014 | Smith et al. |
| 8,699,651 B2 | 4/2014 | Bloomquist et al. |
| 8,753,590 B2 | 6/2014 | Barbosa |
| 8,781,055 B2 | 7/2014 | Toth et al. |
| 8,822,950 B2 | 9/2014 | Evers |
| 8,842,798 B2 | 9/2014 | Russell et al. |
| 8,872,124 B2 | 10/2014 | Graves et al. |
| 8,900,340 B2 | 12/2014 | Abenthung et al. |
| 8,911,695 B2 | 12/2014 | Hasan |
| 8,932,091 B2 | 1/2015 | Nicholson et al. |
| 8,953,731 B2 | 2/2015 | Fawcett et al. |
| 8,989,335 B2 | 3/2015 | Tsang |
| 9,047,997 B2 | 6/2015 | Tsang |
| 9,076,561 B2 | 7/2015 | Brown |
| 9,183,959 B2 | 11/2015 | Bloomquist et al. |
| 9,239,385 B2 | 1/2016 | Fawcett et al. |
| 9,240,253 B2 | 1/2016 | Varnedoe et al. |
| 9,285,487 B2 | 3/2016 | Graves et al. |
| 9,362,009 B2 | 6/2016 | Russell, II et al. |
| 9,396,825 B2 | 7/2016 | Bloomquist et al. |
| 9,443,629 B2 | 9/2016 | Tsang |
| 9,550,704 B2 | 1/2017 | Chi et al. |
| 9,576,691 B2 | 2/2017 | Tsang |
| 9,587,292 B2 | 3/2017 | Lapi et al. |
| 10,820,404 B2 | 10/2020 | Cross et al. |
| 2005/0063514 A1 | 3/2005 | Price et al. |
| 2005/0156144 A1 | 7/2005 | Fukushima et al. |
| 2006/0144793 A1 | 7/2006 | Dadachov |
| 2007/0086909 A1 | 4/2007 | Abenthung et al. |
| 2007/0133731 A1 | 6/2007 | Fawcett et al. |
| 2007/0133734 A1 | 6/2007 | Fawcett et al. |
| 2007/0155976 A1 | 7/2007 | Hunter et al. |
| 2008/0006606 A1 | 1/2008 | Magnaldo |
| 2009/0135990 A1 | 5/2009 | Poon et al. |
| 2009/0274258 A1 | 11/2009 | Holden et al. |
| 2010/0183045 A1 | 7/2010 | Nakahara et al. |
| 2010/0266083 A1 | 10/2010 | Bloomquist et al. |
| 2011/0006186 A1 | 1/2011 | Allen et al. |
| 2011/0009686 A1 | 1/2011 | Allen et al. |
| 2011/0051872 A1 | 3/2011 | Rickard et al. |
| 2011/0051875 A1* | 3/2011 | Bloomquist ........... G21C 19/20 376/202 |
| 2011/0079108 A1 | 4/2011 | Lapi et al. |
| 2011/0096887 A1 | 4/2011 | Piefer |
| 2011/0250107 A1 | 10/2011 | Varnedoe et al. |
| 2011/0280356 A1 | 11/2011 | Tsang |
| 2011/0286565 A1 | 11/2011 | Tsang |
| 2012/0027152 A1 | 2/2012 | Reese et al. |
| 2012/0073958 A1 | 3/2012 | Abenthung et al. |
| 2012/0281799 A1 | 11/2012 | Wells et al. |
| 2012/0285294 A1 | 11/2012 | Shanks et al. |
| 2013/0039822 A1 | 2/2013 | Hasan |
| 2013/0136221 A1 | 5/2013 | Nishikata et al. |
| 2013/0220928 A1 | 8/2013 | Oelsner |
| 2013/0301769 A1 | 11/2013 | Schaffer et al. |
| 2013/0312570 A1 | 11/2013 | Barbosa |
| 2013/0336436 A1 | 12/2013 | Allen et al. |
| 2014/0029710 A1 | 1/2014 | Wilson et al. |
| 2014/0133617 A1 | 5/2014 | Bloomquist et al. |
| 2014/0140462 A1 | 5/2014 | Barbosa |
| 2014/0192942 A1 | 7/2014 | Tsechanski |
| 2014/0231709 A1 | 8/2014 | Barbosa |
| 2014/0234186 A1 | 8/2014 | Barbosa |
| 2015/0023876 A1 | 1/2015 | Cope et al. |
| 2015/0139870 A1 | 5/2015 | Hasan |
| 2015/0243395 A1 | 8/2015 | Tsang |
| 2015/0243396 A1 | 8/2015 | Tsang |
| 2016/0023182 A1 | 1/2016 | Tadokoro et al. |
| 2016/0141061 A1 | 5/2016 | Burgett |
| 2016/0148712 A1 | 5/2016 | Sandquist |
| 2017/0032860 A1 | 2/2017 | Tsang |
| 2017/0048962 A1 | 2/2017 | Zeisler et al. |
| 2017/0251547 A1 | 8/2017 | Ito |
| 2018/0244535 A1 | 8/2018 | Russell, II et al. |
| 2018/0244536 A1 | 8/2018 | Russell, II et al. |
| 2021/0076674 A1 | 3/2021 | Lan et al. |

FOREIGN PATENT DOCUMENTS

| | | |
|---|---|---|
| AR | 077648 A1 | 9/2011 |
| AR | 102621 A1 | 3/2017 |
| AR | 104305 A1 | 7/2017 |
| AR | 104411 A1 | 7/2017 |
| AR | 105386 A1 | 9/2017 |
| AU | 541543 B1 | 1/1985 |
| BE | 682978 A | 12/1966 |
| CA | 2321183 A1 | 10/1999 |
| CA | 2506391 A1 | 11/2005 |
| CA | 2643841 A1 | 5/2009 |
| CA | 2653871 A1 | 8/2009 |
| CA | 2723224 A1 | 11/2009 |
| CA | 2724024 A1 | 11/2009 |
| CA | 2698773 A1 | 10/2010 |
| CA | 2767395 A1 | 1/2011 |
| CA | 2713237 A1 | 2/2011 |
| CA | 2933961 A1 | 8/2011 |
| CA | 2735612 A1 | 10/2011 |
| CA | 2806584 A1 | 2/2012 |
| CA | 2816648 A1 | 5/2012 |
| CA | 2832750 A1 | 10/2012 |
| CA | 2841617 A1 | 1/2013 |
| CA | 2871305 A1 | 10/2013 |
| CA | 2915775 A1 | 10/2013 |
| CA | 2876018 A1 | 12/2013 |
| CA | 2895929 A1 | 6/2014 |
| CA | 2915070 A1 | 12/2014 |
| CN | 1035719 C | 8/1997 |
| CN | 1035720 C | 8/1997 |
| CN | 1035736 C | 8/1997 |
| CN | 101905155 A | 12/2010 |
| CN | 103635272 A | 3/2014 |
| CN | 103650061 A | 3/2014 |
| EP | 2841607 B1 | 12/2016 |
| EP | 2748825 B1 | 3/2017 |
| FR | 1486542 A | 6/1967 |
| GB | 1157117 A | 7/1969 |
| GB | 2000361 A | 1/1979 |
| JP | H07218697 A | 8/1995 |
| JP | 2011015970 A | 1/2011 |
| JP | 2011017703 A | 1/2011 |
| JP | 2011047935 A | 3/2011 |
| JP | 2011047938 A | 3/2011 |
| JP | 2020510847 A | 4/2020 |
| JP | 2020-514245 A | 5/2020 |
| JP | 6697396 B2 | 5/2020 |
| KR | 10-0936016 B | 1/2010 |
| KR | 10-1365797 B | 3/2014 |
| KR | 10-1370189 B | 3/2014 |
| KR | 10-1542708 B | 8/2015 |
| KR | 10-1587837 B | 1/2016 |
| KR | 10-1754430 B | 7/2017 |
| RU | 2200997 C2 | 3/2003 |
| RU | 2403086 C2 | 11/2010 |
| RU | 2462793 C2 | 9/2012 |
| RU | 2560966 C2 | 8/2015 |
| RU | 2014147619 A | 6/2016 |
| RU | 2630475 C2 | 9/2017 |
| SU | 927753 A1 | 5/1982 |
| WO | WO 1992016949 A1 | 10/1992 |
| WO | WO 1994004463 A2 | 3/1994 |
| WO | WO 1994004463 A3 | 3/1994 |
| WO | WO 1995016996 A1 | 6/1995 |
| WO | WO 1997001852 A1 | 1/1997 |
| WO | WO 2000003399 A1 | 1/2000 |
| WO | WO 2007041730 A1 | 4/2007 |
| WO | WO 2009135163 A2 | 11/2009 |

(56) References Cited

FOREIGN PATENT DOCUMENTS

| WO | WO 2009135163 A3 | 2/2010 |
|---|---|---|
| WO | WO 2007041730 A9 | 5/2010 |
| WO | WO 2010132043 A1 | 11/2010 |
| WO | WO 2011005736 A2 | 1/2011 |
| WO | WO 2011093938 A2 | 8/2011 |
| WO | WO 2011126522 A2 | 10/2011 |
| WO | WO 2011126522 A3 | 12/2011 |
| WO | WO 2011156446 A2 | 12/2011 |
| WO | WO 2011093938 A3 | 1/2012 |
| WO | WO 2012018752 A2 | 2/2012 |
| WO | WO 2012048077 A1 | 4/2012 |
| WO | WO 2011156446 A3 | 5/2012 |
| WO | WO 2012125994 A2 | 9/2012 |
| WO | WO 2013010047 A1 | 1/2013 |
| WO | WO 2017012655 A1 | 1/2013 |
| WO | WO 2013027207 A1 | 2/2013 |
| WO | WO 2012125994 A3 | 4/2013 |
| WO | WO 2012125994 A9 | 6/2013 |
| WO | WO 2013082699 A1 | 6/2013 |
| WO | WO 2013159201 A1 | 10/2013 |
| WO | WO2013027207 A9 | 1/2014 |
| WO | WO 2014163956 A1 | 10/2014 |
| WO | WO 2014186898 A1 | 11/2014 |
| WO | WO 2016023112 A1 | 2/2016 |
| WO | WO 2016023113 A1 | 2/2016 |
| WO | WO 2016075212 A1 | 5/2016 |
| WO | WO 2016081484 A1 | 5/2016 |
| WO | WO 2016081675 A1 | 5/2016 |
| WO | WO 2016108939 A2 | 7/2016 |
| WO | WO 2016173664 A1 | 11/2016 |
| WO | WO 2016207054 A1 | 12/2016 |
| WO | WO 2017082748 A1 | 5/2017 |
| WO | WO 2018156828 A1 | 8/2018 |
| WO | WO 2018156835 A1 | 8/2018 |
| WO | WO 2018156910 A1 | 8/2018 |

OTHER PUBLICATIONS

International Search Report and Written Opinion of corresponding International Application PCT/US2018/019322, mailed on Jul. 11, 2018, all enclosed pages cited.
International Search Report and Written Opinion of corresponding International Application PCT/US2018/019443, mailed on Jul. 9, 2018, all enclosed pages cited.
Monroy-Guzman et al., "Titanium Molybdate Gels as Matrix of 99Mo/99mTc Generators", Journal of Nuclear and Radiochemical Sciences, vol. 8, No. 1 (Jan. 2007), p. 11-19 (p. 11, col. 1, para 1; p. 11, col. 2, para 4; p. 12; p. 13, col. 1, para 3; p. 13, col. 2, para 12; p. 14; p. 16, col. 1, para 3; p. 16, col. 2, para 1; p. 17, col. 2, para 1; p. 18, col. 1, para 2; p. 18, col. 2, para 1; abstract; title; tables 1-2; figure 2D, 3B and 4A.
Amin et al., "Effect of Al:Mo molar ratio on elution performance of 99Mo/99mTc generators based on Al99Mo gels," J Radioanal Nucl Chem (2016) 309;485-492.
Guedes-Silva et al., "Influence of Alumina Phases on the Molybdenum Adsorption Capacity and Chemical Stability for 99Mo/99mTc Generators Columns, " Materials Research (2017); 19(4): 791-794.
Gopalakrishna et al., "Preparation of 99Mo from the 100Mo(γ, η) reaction and chemical separation of 99mTc," J Radioanal Nucl Chem (2016) 308:431-438.
Fasih et al., "Preparation and evaluation of nano-crystalline titania as sorbent for 99Mo/99mTc generator," Separation and Science Technology (2016) 51:13, 2115-2121.
Pupillo et al., "Accelerator based production of 99Mo: a comparison between the 100Mo(p,x) and 96Zr(α,n) reactions," J Radioanal Nucl Chem (2015) 305:73-78.
Pupillo et al., "Experimental cross section evaluation for innovative 99Mo production via the (α,n) reaction on 96Zr target, " J Radioanal Nucl Chem (2014) 302:911-917.

El-Absy et al., "Preparation of 99Mo/99mTc generator based on alumina 99Mo-molybdate (VI) gel, " J Radioanal Nucl Chem (2014) 299:1859-1864.
Iller et al., "Synthesis and structural investigations of gel metal oxide composites WO3—ZrO2, WO3—TiO2, WO3—ZrO2—SiO2, and their evaluation as materials for the preparation of 188W/188Re generator," Applied Radiation and Isotopes 75 (2013) 115-127.
Chakravarty et al., "Nano Structured Metal Oxides as Potential Sorbents for 188W/188Re Generator: A Comparative Study," Separation Science and Technology (2013) 48:4, 607-616.
Chakravarty et al., :An electrochemical procedure to concentrate 99mTc availed from a zirconium [99Mo] molybdate gel generator, Applied Radiation and Isotopes 70 (2012) 375-379.
Mostafa et al., "Labeling of ceftriaxone for infective inflammation imaging using 99mTc eluted from 99Mo 99mTc generator based on zirconium molybdate," Applied Radiation and Isotopes 68 (2010) 1959-1963.
Tereshatov et al., "Isocratic anion exchange separations of Group V elements," J Radioanal Nucl Chem (2010) 286:9-16.
Davarpanah et al., "Influence of drying conditions of zirconium molybdate gel on performance of 99mTc gel generator," Applied Radiation and Isotopes 67 (2009) 1796-1801.
Sahoo et al., "Synthesis, Characterization, and Photocatalytic Properties of ZrMo2O8," J. Phys. Chem. C 2009, 113, 10661-10666.
Sahoo et al., "Synthesis, structure and photocatalytic properties of β-ZrMo2O8," Bull. Mater. Sci., vol. 32, No. 3, Jun. 2009, pp. 337-342.
Magnaldo et al., "Nucleation and crystal growth of zirconium molybdate hydrate in nitric acid," Chemical Engineering Science 62 (2007) 766-774.
Monroy-Guzman et al., "Titanium Molybdate Gels as Matrix of 99Mo/99mTc Generators, "Journal of Nuclear and Radiochemical Sciences, vol. 8, No. 1, pp. 11-19, 2007.
Monroy-Guzman et al., "Production optimization of 99Mo/99mTc zirconium molybate gel generators at semi-automatic device: DISIGEG," Applied Radiation and Isotopes 70 (2012) 103-111.
Monroy-Guzman et al., "99Mo/99mTc Generators Performances Prepared from Zirconium Molybate Gels," J. Braz. Chem. Soc., vol. 19, No. 3, 380-388, 2008.
Monroy-Guzman et al., "Determination of Mo, W and Zr in molybdates and tungstates of zirconium and titanium," Journal of Radioanalytical and Nuclear Chemistry, vol. 271, No. 3 (2007) 523-532.
Monroy-Guzman et al., "Effect of Zr:Mo ratio on 99mTc generator performance based on zirconium molybdate gels," Applied Radiation and Isotopes 59 (2003) 27-34.
Office Action from U.S. Appl. No. 15/902,140 dated Aug. 20, 2020, all enclosed pages cited).
Scadden et al. ("Radiochemistry of Molybdenum," National Academy of Sciences, 1960, pp. 1-38) (Year: 1960).
Office Action from U.S. Appl. No. 15/902,534 dated Sep. 11, 2020, all enclosed pages cited).
Office Action and Search Report from Russian Patent Application No. 2019129820 dated Jun. 2, 2020, all enclosed pages cited.
Office Action and Search Report from Russian Patent Application No. 2019129825 dated Aug. 10, 2020, all enclosed pages cited.
Lidin R.A, et al., Khimicheskie svojstva neorganichheskikh veshchestv, Moscow, Kimia 1997, pp. 388, section 772, reaction 3. (not in English) (See Office Actions and Search Reports from Russian Patent Application Nos. 2019129820 and 2019129825).
Australian Examination Report from Australian Patent Application No. 2018224128 dated Feb. 24, 2020, all enclosed pages cited.
International Preliminary Report on Patentability, PCT/2018/019322, dated Aug. 27, 2019, 17 pages.
International Preliminary Report on Patentability, PCT/2018/019335, dated Aug. 27, 2019, 21 pages.
International Preliminary Report on Patentability, PCT/2018/019443, dated Aug. 27, 2019, 5 pages.
Extended European Search Report, European Application No. 18758354.7, dated Nov. 25, 2020, 7 pages.
Extended European Search Report, European Application No. 18757129.4, dated Nov. 25, 2020, 6 pages.

(56) References Cited

OTHER PUBLICATIONS

J. V. Evans et al., "Zircomium Molybdate Gel as a Generator for Technetium-99mm—I. The Concept and its Evaluation." Appl. Radiat. Isot. vol. 38, No. 1, pp. 19-23 (1987).

P.W. Moore et al., "Zircomium Molybdate Gel as a Generator for Technetium-99mm—II. High Activity Generators." Appl. Radiat. Isot. vol. 38, No. 1, pp. 25-29 (1987).

Osso et al., "Preparation of a Gel of Zirconium Molybdate for Use in the Generators of 99Mo-99mTc Prepared with 99Mo Produced by the 98Mo(n,g )99Mo Reaction," Presented at the 1998 International Meeting on Reduced Enrichment for Research and Test Reactors; Oct. 18-23, 1998; Sao Paulo, Brazil.

Monroy-Guzman et al., "Magnesium-Molybdate Compounds as a Matrix for 99Mo/99mTc Generators," Pharmaceuticals 2011, 4(2), 215-232.

Clearfield, A., and R. H. Blessing. "The preparation and crystal structure of a basic zirconium molybdate and its relationship to ion exchange gels." Journal of Inorganic and Nuclear Chemistry, vol. 34 (8): 2643-2663 (1972) Abstract only.

* cited by examiner

TITANIUM-MOLYBDATE AND METHOD FOR MAKING THE SAME

CROSS-REFERENCE TO RELATED APPLICATIONS

This application is a divisional application of U.S. utility patent application Ser. No. 15/902,086, filed on Feb. 22, 2018, which claims priority from U.S. provisional patent application Ser. No. 62/463,020, filed on Feb. 24, 2017, in the United States Patent and Trademark Office and from U.S. provisional patent application Ser. No. 62/592,737, filed on Nov. 30, 2017, in the United States Patent and Trademark Office. The disclosures of which are incorporated herein by reference in their entireties.

TECHNICAL FIELD

The presently-disclosed invention relates generally to titanium-molybdate materials suitable for use in technetium-99m generators (Mo-99/Tc-99m generators) and methods for making the same.

BACKGROUND OF THE INVENTION

Technetium-99m (Tc-99m) is the most commonly used radioisotope in nuclear medicine (e.g., medical diagnostic imaging). Tc-99m (m is metastable) is typically injected into a patient which, when used with certain equipment, is used to image the patient's internal organs. However, Tc-99m has a half-life of only six (6) hours. As such, readily available sources of Tc-99m are of particular interest and/or need in at least the nuclear medicine field.

Given the short half-life of Tc-99m, Tc-99m is typically obtained at the location and/or time of need (e.g., at a pharmacy, hospital, etc.) via a Mo-99/Tc-99m generator. Mo-99/Tc-99m generators are devices used to extract the metastable isotope of technetium (i.e., Tc-99m) from a source of decaying molybdenum-99 (Mo-99) by passing saline through the Mo-99 material. Mo-99 is unstable and decays with a 66-hour half-life to Tc-99m. Mo-99 is typically produced in a high-flux nuclear reactor from the irradiation of highly-enriched uranium targets (93% Uranium-235) and shipped to Mo-99/Tc-99m generator manufacturing sites. Mo-99/Tc-99m generators are then distributed from these centralized locations to hospitals and pharmacies through-out the country. Since the number of production sites are limited, and compounded by the limited number of available high flux nuclear reactors, the supply of Mo-99 is susceptible to frequent interruptions and shortages resulting in delayed nuclear medicine procedures.

There at least remains a need, therefore, for a process for producing material suitable for use in technetium-99m generators (Mo-99/Tc-99m generators).

SUMMARY OF INVENTION

One or more embodiments of the invention may address one or more of the aforementioned problems. Certain embodiments according to the invention provide a process for producing a titanium-molybdate (Ti—Mo), such as a porous Ti—Mo material suitable for use in technetium-99m generators. The term "titanium-molybdate", as used herein, generally refers to titanium-molybdate, titanium-molybdenum, molybdenum-titanate, or any form of Mo—Ti or Ti—Mo species. Processes according to certain embodiments of the invention may comprise reacting a metal molybdenum (Mo) material in a liquid medium (e.g., an aqueous medium) with a first acid (e.g., a mineral acid) to provide a Mo composition and combining the Mo composition with a titanium source (e.g., $TiCl_3$) to provide a Ti—Mo composition. Processes according to certain embodiments of the invention may further comprise pH adjusting the Ti—Mo composition with a base (e.g., ammonium hydroxide) to precipitate a plurality of Ti—Mo particulates (referred to interchangeably herein as particles). In accordance with certain embodiments of the invention, the Ti—Mo particulates may be isolated from or separated from the liquid medium. In accordance with certain embodiments of the invention, the isolated Ti—Mo particulates may take the form of a slurry including a residual amount of the liquid medium therein. The isolated Ti—Mo particulates may be subjected to heat energy to at least partially dry and/or partially crystallize the Ti—Mo particulates as well as to crystallize a plurality of inorganic salts within a porous network defined by a Ti—Mo matrix of the individual Ti—Mo particulates. For example, one or more of the Ti—Mo particulates may comprise a porous matrix including a plurality of pores and/or channels therein and at least a portion of the crystallized inorganic salts reside within the pores and/or channels. After crystallization of the inorganic salts within at least a portion of the pores and/or channels of the Ti—Mo particulates, the Ti—Mo particulates, which may be agglomerated together, may be milled and washed for removal of the crystallized inorganic salts. In accordance with certain embodiments of the invention, the processes may comprise irradiating a metal molybdenum target to provide the Mo material as discussed herein. That is, the step of irradiating a metal molybdenum target to provide the Mo material may be carried out prior to the combination of the metal Mo material in a liquid medium with a first acid. The metal molybdenum target, for example, may comprise a tubular capsule comprising metal molybdenum and a plurality of internal metal molybdenum components (e.g., balls, rods, wires, discs, etc.) housed inside of the tubular capsule. Alternatively, the metal molybdenum target, for example, may be one or more metal molybdenum components (e.g., balls, rods, wires, discs, etc.) used alone or in combination, such as a rod with a series of discs. In this regard, certain embodiments of the invention comprise a Ti—Mo material produced according to processes disclosed herein.

In yet another aspect, the invention provides a Ti—Mo material comprising a plurality Ti—Mo particulates comprising a porous structure including a plurality of pores, channels, or both. In this regard, one or more of the plurality Ti—Mo particulates may independently comprise a porous structure (e.g., porous matrix defined by an individual Ti—Mo particle) including a plurality of pores, channels, or both. The Ti—Mo material, in accordance with certain embodiments of the invention, may further comprise one or more solid inorganic salts, in which at least a portion of the one or more inorganic salts may be disposed within the pores and/or channels of the porous structure (e.g., porous matrix defined by an individual Ti—Mo particle). In this regard, such embodiments of the invention may in some instances comprise an intermediate product for further processing if so desired.

In yet another aspect, the invention provides a Ti—Mo material comprising a plurality Ti—Mo particulates, in which one or more of the Ti—Mo particulates comprise a porous structure including a plurality of pores, channels, or both.

In accordance with certain embodiments of the invention, the process may comprise irradiating the resulting Ti—Mo material comprising a plurality of Ti—Mo particulates. For example, the irradiation may be carried out prior to loading the Ti—Mo material into an elution vessel.

In accordance with certain embodiments of the invention, the Ti—Mo material comprises an eluting efficiency of 30% or greater, an eluting efficiency of 80% or greater, 90% or greater, or 95% or greater. The Ti—Mo material, in accordance with certain embodiments of the invention, may be disposed in an elution column (e.g., technetium-99m generator) and at least 90% (e.g., at least 95% or at least 99%) of a total technetium content releases from the Ti—Mo material via passing an aqueous liquid (e.g., water, saline, dilute acid) through the Ti—Mo material.

Other embodiments of the invention are described herein.

BRIEF DESCRIPTION OF THE DRAWING(S)

The invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout, and wherein.

DETAILED DESCRIPTION

Figure 1:
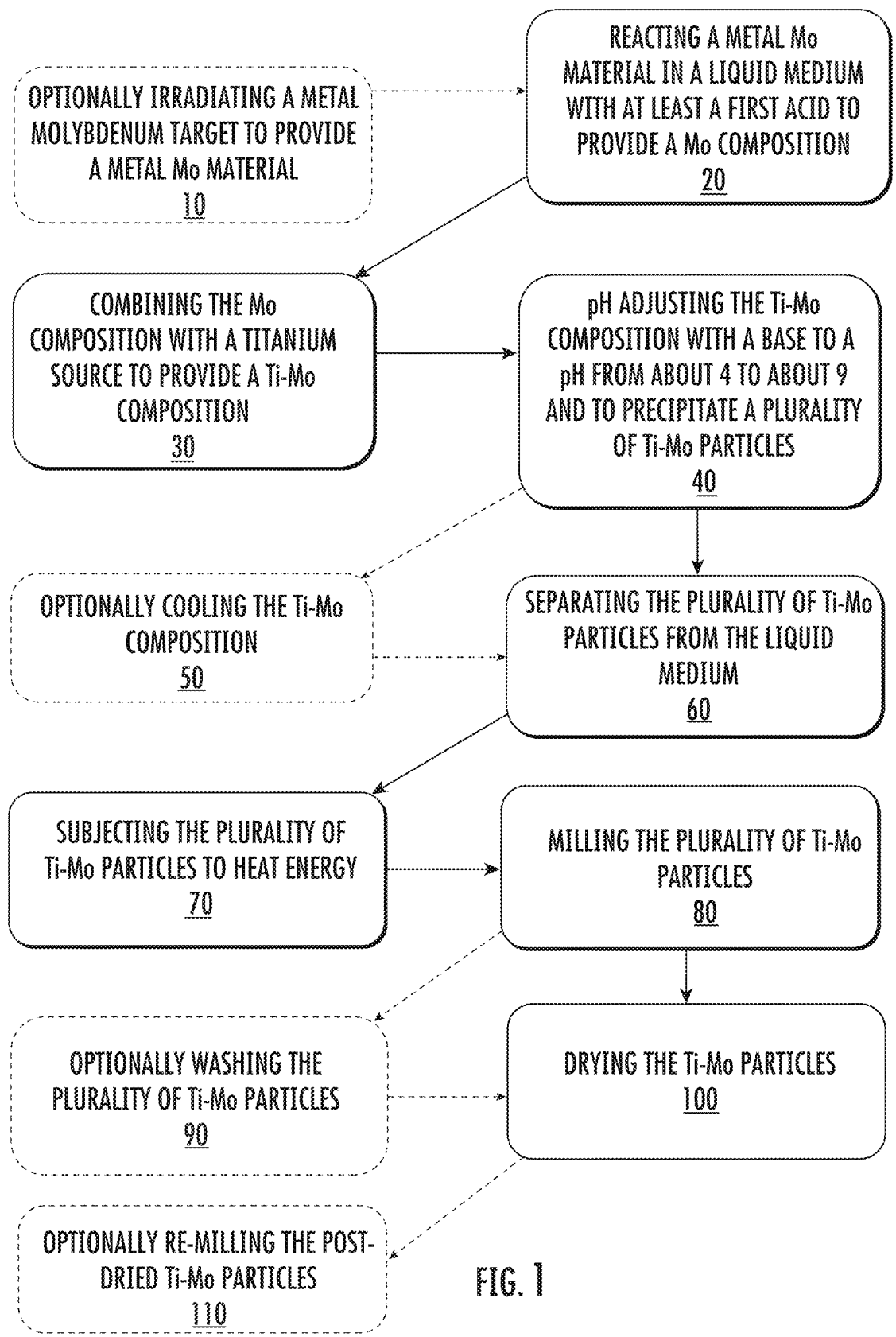
FIG. 1 is a block diagram of a process for producing a titanium-molybdate material according to an embodiment of the invention.

The invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

The invention provides, according to certain embodiments, a process for producing a titanium-molybdate (Ti—Mo), such as a porous Ti—Mo material suitable for use in technetium-99m generators. The term "titanium-molybdate", as used herein, generally refers to titanium-molybdate, titanium-molybdenum, molybdenum-titanate, or any form of Mo—Ti or Ti—Mo species.

In accordance with certain embodiments, the process may include a step of reacting a metal molybdenum (Mo) material (such as a solid molybdenum metal in a variety of forms including powder and bulk solids of various particle sizes and geometries) in a liquid medium with an acid or acids (e.g., a mineral acid) to provide a Mo composition (e.g., a solution of Mo) and combining the Mo composition with a titanium source (e.g., $TiCl_3$) to provide a Ti—Mo composition. Metal molybdenum, for example, is usually produced by powder metallurgy techniques in which Mo powder is hydrostatically compacted and sintered. A metal molybdenum material, in accordance with certain embodiments of the invention, may comprise Mo atoms, consist essentially of Mo atoms, or consist of Mo atoms. Non-limiting examples of a metal molybdenum material include, but are not limited to, natural Mo, enriched Mo (including, but not limited to, Mo enriched in Mo-98), Mo alloys (including, but not limited to, any material where the Mo content is above 50% and the other constituent(s) making the alloy is easily separated from the Mo via chemistry).

Processes according to certain embodiments of the invention may further comprise pH adjusting the Ti—Mo composition with a base (e.g., ammonium hydroxide) to precipitate a plurality of Ti—Mo particulates. In accordance with certain embodiments of the invention, the process for producing solid Ti—Mo may comprise a single-pot process, in which the metal Mo material is transformed into solid Ti—Mo particulates in a single pot (i.e., the same tank or pot).

In accordance with certain embodiments, the acid or acids utilized may comprise one or more mineral acids or hydrogen peroxide. In this regard, mineral acids suitable for combination with the metal Mo may comprise hydrochloric acid, nitric acid, sulfuric acid, phosphoric acid, hydrofluoric acid, boric acid, hydrobromic acid, perchloric acid, hydroiodic acid, halogen acids (such as HAt where At is Astatine), or any combination thereof. In accordance with certain embodiments, the mineral acid may comprise hydrochloric acid, nitric acid, or a combination thereof. In this regard, the metal Mo may be immersed in the liquid medium and agitated while one or more of the foregoing acids is added to lower the pH of the liquid medium. In accordance with certain embodiments, the step of reacting the metal molybdenum (Mo) material in the liquid medium with the first acid may subject the metal Mo material and/or any metal oxide formed thereby to a process including, but not limited to, oxidation, dissolution, other reaction processes, or a combination thereof. In accordance with certain embodiments of the invention, the liquid medium may comprise an aqueous medium. In this regard, the liquid medium may comprise water. In accordance with certain embodiments of the invention, the liquid medium consists of water, to which the metal Mo and one or more of the foregoing acids are added.

In accordance with certain embodiments of the invention, the step of reacting the metal molybdenum (Mo) material in the liquid medium with the first acid may be performed at a molar ratio of Mo to acid (Mo:Acid) in a range of about 0.1:1 to about 10:1.

The step of reacting the metal Mo may further comprise controlling a temperature of the liquid medium (e.g., aqueous medium), in which the metal Mo is immersed at any point during the reaction. In this regard, the temperature control of the liquid medium (e.g., aqueous medium) may comprise the addition of heat to the liquid medium, removal of heat from the liquid medium, no added heat, or a combination thereof. Addition and/or removal of heat may be achieved by a variety of known heat-transfer systems (e.g., internal tank coils, heat exchangers, jacketed tanks, etc.). In accordance with certain embodiments of the invention, for instance, the temperature of the liquid medium may be controlled throughout the reaction by adding and/or removing heat from the liquid medium as desired. In accordance with certain embodiments of the invention, for example, heat may be supplied to the liquid medium, in which the metal Mo is immersed, sufficient to raise the temperature of the liquid medium to or above about 25° C., to or above about 35° C., to or above about 45° C., to or above about 55° C., etc. The temperature of the liquid medium may begin to rise. In this regard, controlling the temperature of the liquid medium by removing heat given off may be desirable, for example, for at least safety concerns. If the liquid medium includes any co-chemicals, the boiling points of such chemicals may, at least partially, dictate the desired maximum temperature to which the liquid medium is allowed to reach. In accordance with certain embodiments of the invention, the temperature of the liquid medium may be controlled by maintaining the temperature of the liquid medium at or below about 80° C., for example, by removal of heat from the liquid medium. In accordance with certain embodiments of the invention, the temperature of the liquid medium may be controlled by maintaining the temperature of the liquid medium at or below about 100° C., at or below about 80° C., at or below about 70° C., at or below about 60° C., at or below about 50° C., at or below about 40° C.

Reacting may further comprise agitating the metal Mo material and the liquid medium during at least a portion of the step. In this regard, the agitation of the metal Mo material and liquid medium may provide an improved interaction of the metal Mo material with the liquid medium as the pH of the liquid medium is reduced via addition of acid (i.e., one or more mineral acids). For example, agitation may provide improved access of the metal Mo material to the acid in the liquid medium and may speed up any resulting reaction process including, but not limited to, oxidation, dissolution, or a combination thereof. In accordance with certain embodiments of the invention, for instance, the agitation may comprise mechanically mixing the metal Mo material and the liquid medium. In accordance with certain embodiments of the invention, the agitation may be improved by utilizing an internal tank baffles to facilitate vertical mixing of the metal Mo and liquid medium.

In accordance with certain embodiments of the invention, the step of combining the metal Mo material may comprise simultaneously, for at least a portion of the step, adding one or more acids to the liquid medium, in which the metal Mo material is immersed, controlling the temperature of the liquid medium, and agitating the metal Mo material and liquid medium. The resulting Mo composition (e.g., a solution of Mo) may then be subjected to further processing.

In accordance with certain embodiments of the invention, a process is provided for producing a titanium-molybdate (Ti—Mo) comprising oxidizing a metal molybdenum (Mo) material, in whole or in part, in a liquid medium with a first acid to provide a Mo composition, combining the Mo composition with a titanium source to provide a Ti—Mo composition, and pH adjusting the Ti—Mo composition with a base to precipitate a plurality of Ti—Mo particulates.

In accordance with certain embodiments of the invention, a process is provided for producing a titanium-molybdate (Ti—Mo) comprising dissolving a metal molybdenum (Mo) material, in whole or in part, in a liquid medium with a first acid to provide a Mo composition, combining the Mo composition with a titanium source to provide a Ti—Mo composition, and pH adjusting the Ti—Mo composition with a base to precipitate a plurality of Ti—Mo particulates.

The process parameters and/or process conditions for oxidizing and/or dissolving in the aforementioned embodiments can be the same as discussed herein as for the reacting step.

In accordance with certain embodiments of the invention, after formation of the Mo composition, the process may comprise combining the Mo composition with a titanium source (e.g., $TiCl_3$) to provide a Ti—Mo composition. The titanium source may comprise a titanium chloride. In accordance with certain embodiments of the invention, the titanium chloride may comprise titanium(III) chloride ($TiCl_3$), titanium(II) chloride ($TiCl_2$), titanium tetrachloride ($TiCl_4$), or any combination thereof. The step of combining the Mo composition with the titanium source to provide the Ti—Mo composition, in accordance with certain embodiments of the invention, may comprise adding the titanium source to the Mo composition. In accordance with certain embodiments of the invention, the Mo composition is agitated or mixed during addition of the titanium source.

The addition of the titanium source to the Mo composition may comprise, for example, dropwise addition of the titanium source to the Mo composition. In this regard, the addition of the titanium source to the Mo composition may comprise administering one drop (e.g., 0.05 mL) of the titanium source at a time to an agitating Mo composition. In accordance with certain embodiments of the invention, the number of drops of the titanium source added to the Mo composition per minute may vary. Other forms of administering the titanium source can be used including, but not limited to, a mist, spray, or a combination thereof. The step of combining the Mo composition with the titanium source to provide the Ti—Mo composition may also comprise adding an acid (e.g. a second mineral acid) to the Mo composition. In accordance with certain embodiments of the invention, the temperature may be dropped, preferably in a range of about 25° C. to about 35° C., when the titanium source is added with the acid. The acid may comprise a mineral acid as disclosed above. For example, the mineral acid added to the Mo composition during the combination of the titanium source and the Mo composition may comprise hydrochloric acid. In accordance with certain embodiments of the invention, the titanium source and the acid (e.g., hydrochloric acid) may be simultaneously added to the Mo composition. For instance, the titanium source may comprise a liquid composition including, for example, one or more titanium-containing compounds disclosed herein (e.g., $TiCl_3$) and the acid (e.g., hydrochloric acid). In this regard, the addition of the titanium source may comprise the simultaneous addition of titanium-containing compound(s) and acid. In accordance with certain embodiments of the invention, the resulting Ti—Mo composition may comprise a final pH of about 3 or less (e.g., about 2 or less, or about 1 or less) at the end of the step of combining the Mo composition with the titanium source. In accordance with certain embodiments of the invention, the step of combining the Mo composition with a titanium source (e.g., $TiCl_3$) to provide a Ti—Mo composition may be performed until a molar ratio of titanium to Mo (Ti:Mo) of about 0.1:1 to about 10:1 is reached.

Processes according to certain embodiments of the invention may further comprise pH adjusting the Ti—Mo composition with a base (e.g., ammonium hydroxide, sodium hydroxide, and metal hydroxide(s)) to precipitate a plurality of Ti—Mo particulates. In accordance with certain embodiments of the invention, the pH of the Ti—Mo composition is adjusted with a base to a pH in the range from about 4 to about 9. As such, in certain embodiments of the invention, the pH of the Ti—Mo composition may be adjusted to at least about any of the following: 4, 4.5, 5, 5.5, 6, 6.5, and 7 and/or at most about 9, 8.5, 8, 7.5, 7, 6.5, and 6. During the pH adjustment of the Ti—Mo composition, the Ti—Mo composition may be subjected to agitation, for example, to mechanical agitation.

In accordance with certain embodiments of the invention, the pH adjustment of the Ti—Mo composition may comprise adding the base in a dropwise manner. In this regard, the addition of the base to the Ti—Mo composition may comprise administering one drop (e.g., 0.05 mL) of the base at a time to an agitating Ti—Mo composition. In accordance with certain embodiments of the invention, the number of drops of the base added to the Ti—Mo composition per minute may vary.

The Ti—Mo composition after the pH adjustment step includes the plurality of precipitated Ti—Mo particulates from the pH adjustment, and may be subjected to a cooling or chilling step either during pH adjustment and/or subsequent to the pH adjustment. In accordance with certain embodiments of the invention, the step of cooling the Ti—Mo composition may comprise reducing the temperature of the Ti—Mo composition to between about 0° C. to about 20° C. (e.g., about 3° C. to about 10° C.). As such, in certain embodiments of the invention, the step of cooling the Ti—Mo composition may comprise reducing the temperature of the Ti—Mo composition to at least about any of the following: 3° C., 5° C., 8° C., 10° C., and 12° C. and/or at most about 20° C., 15° C., 12° C., and 10° C. In this regard, the cooling step may facilitate additional crystallization of inorganic salts within the porous Ti—Mo particulates and/or within the surface of the porous Ti—Mo particulates. As described in more detail below, the additional solid inorganic salts, when subsequently dissolved and/or removed, may form numerous cracks, caverns/pores, and/or channels that provide passage ways for technetium atoms to escape from the Ti—Mo particulates.

Regardless of whether or not the Ti—Mo composition after precipitation of the plurality of Ti—Mo particulates is subjected to the cooling step discussed above, the Ti—Mo composition may be subjected to a separating operation (e.g., a solid-liquid separation). In this regard, processes according to certain embodiments of the invention may comprise separating the plurality of Ti—Mo particulates from the liquid medium (e.g., unwanted bulk liquid medium). In this regard, the Ti—Mo particulates may be isolated from or separated from the unwanted liquid medium. In accordance with certain embodiments of the invention, the isolated Ti—Mo particulates may take the form as slurry including a residual amount of the liquid medium therein. In accordance with certain embodiments of the invention, the step of separating the plurality of Ti—Mo particulates from the liquid medium may comprising filtering (e.g., vacuum-filtering) or centrifuging the Ti—Mo composition to retain at least most of the plurality of Ti—Mo particulates. Filtering media may include, but are not limited to, paper, sintered metal, metal mesh, or a combination thereof. A primary and/or a secondary filtering media may be used. The separating step may comprise utilization of a metal filtering surface, wherein at least most of the plurality of Ti—Mo particulates are retained on the metal filtering surface. As noted above, the isolated or retained Ti—Mo particulates may take the form as a slurry including a residual amount of the liquid medium therein.

In accordance with certain embodiments of the invention, the isolated or retained Ti—Mo particulates (e.g., in the form of a slurry) may be subjected to heat energy to at least partially dry and/or partially crystallize the Ti—Mo particulates as well as to crystallize a plurality of inorganic salts within a porous network defined by a Ti—Mo matrix of the individual Ti—Mo particulates. During exposure to heat energy, the residual liquid medium entrained in the Ti—Mo particulates begins to evaporate and the inorganic salts crystallize and/or grow in size. In accordance with certain embodiments of the invention, at least a portion of the inorganic salts crystallize and grow in size internally within the porous structure (e.g., porous matrix of Ti—Mo) of the Ti—Mo particulates. For instance, the isolated or retained Ti—Mo particulates may be subjected to heat energy to at least partially dry and/or partially crystallize the Ti—Mo particulates as well as to crystallize and/or grow a plurality of inorganic salts within a porous network defined by a Ti—Mo matrix of the individual Ti—Mo particulates. For example, one or more of the Ti—Mo particulates may comprise a porous matrix including a plurality of pores and/or channels therein and at least a portion of the crystallized inorganic salts reside within the pores and/or channels. In accordance with certain embodiments of the invention, the inorganic salts comprise ammonium chloride, ammonium nitrate, and/or ammonium hydroxide. The titanium-molybdate molecules, however, remain in a somewhat amorphous solid state without any strong crystal state.

The step of subjecting the plurality of Ti—Mo particulates to heat energy, in accordance with certain embodiments of the invention, may comprise exposing the plurality of Ti—Mo particulates to infrared radiation. In accordance with certain embodiments of the invention, the infrared radiation comprises a wavelength from about 700 nm to about 1400 nm. As such, in certain embodiments of the invention, the infrared radiation may comprise a wavelength from at least about any of the following: 700, 750, 800, 850, 900, 920, 940, 960, 980, and 1000 nm and/or at most about 1400, 1300, 1200, 1150, 1100, 1080, 1060, 1040, 1020, and 1000 nm.

In accordance with certain embodiments of the invention, the heat energy source may comprise convective heating, freeze drying, an infrared heater, such as one or more light-emitting-diodes (LEDs), quartz crystal, quartz infrared heating elements, and incandescent light bulbs producing infrared light. In accordance with certain embodiments of the invention, the operating temperature may be controlled to be from about 20° C. to about 80° C. In this regard, the operating temperature may comprise at least about any of the following: 20° C., 30° C., 40° C., 45° C., 50° C., 55° C., and 60° C. and/or at most about 80° C., 75° C., 70° C., 65° C., and 60° C.

Subsequent to subjecting the Ti—Mo particulates to heat energy, the Ti—Mo particulates, which include inorganic salt crystals located within the porous structure/matrix of the Ti—Mo particulates, may optionally be subjected to a milling or grinding operation. After crystallization of the inorganic salts (e.g., ammonium chloride, ammonium nitrate, and/or ammonium hydroxide) within at least a portion of the pores and/or channels of the Ti—Mo particulates, the Ti—Mo particulates, which may be agglomerated together, may be subjected to a milling or grinding operation to provide a more free-flowing material. In accordance with certain embodiments of the invention, the Ti—Mo particulates may be milled by many commercially available mills, such as ball mills, hammer mills, high pressure grinding mills, tower mills, and wet mills (e.g., conical wet mill).

In accordance with certain embodiments of the invention, the average size of the plurality of Ti—Mo particulates after the milling step may comprise from about 10 microns to about 1275 microns (e.g., about 100 microns to about 200 microns, about 630 microns to about 1015 microns, etc.). In accordance with certain embodiments of the invention, for example, the average size of the plurality of Ti—Mo particulates after the milling step may comprise from at least about any of the following: 10, 50, 75, 125, 150, 175, 200, 225, 250, 275, 300, 350, 400, 450, 500, 550, 600, 650, 700, 750, 800, 850, 900, 925, and 950 microns and/or at most about 1275, 1250, 1225, 1200, 1175, 1150, 1125, 1100, 1050, 1000, and 950 microns.

In accordance with certain embodiments of the invention, select particle sizes can be selected by mechanical filters, chemical filters, or a combination thereof.

The milled Ti—Mo particulates, according to certain embodiments of the invention, may be subjected to a washing step. The washing step, for example, may be desired to dissolve and/or remove the inorganic salts to open-up or make available the internal porous structure of the individual Ti—Mo particulates. As noted above, the porous Ti—Mo particulates may comprise a plurality of pores and/or internal channels therein. Upon dissolution and/or removal of the inorganic salts in the pores and/or channels, the surface area of the Ti—Mo particulates available for releasing technetium atoms (e.g., Tc-99m) is greatly increased. In this regard, the Ti—Mo particulates may comprise a greater amount of titanium-molybdate atoms available for releasing technetium atoms (e.g., Tc-99m) than non-porous particulates as the internally available porous structure provides more pathways for technetium release and/or extraction. In accordance with certain embodiments of the invention, the washing step may comprise washing the Ti—Mo particulates with a liquid that can dissolve and/or remove the inorganic salts (e.g., inorganic salts comprise ammonium chloride, ammonium nitrate, and/or ammonium hydroxide). According to certain embodiments of the invention the Ti—Mo particulates may be flushed with water to dissolve and/or remove the inorganic salts. As the solubility of the inorganic salts (e.g., ammonium chloride, ammonium nitrate, and/or ammonium hydroxide) likely increases with temperature, the liquid (e.g., water) used to flush or rinse the Ti—Mo particulates may be increased (e.g., 70° C. to 85° C. of water) to provide faster dissolution and/or removal of the inorganic salts. In accordance with certain embodiments, the Ti—Mo particulates may alternatively be submerged and/or soaked in the liquid and then drained. In such embodiments of the invention, the Ti—Mo particulates may need to be submerged and/or soaked in fresh liquid and subsequently drained more than one time to remove a sufficient amount of the inorganic salts.

In accordance with certain embodiments of the invention, the washed Ti—Mo particulates may be collected and dried to remove most of the washing liquid. The drying operation is not particularly limited. After drying the post-washed Ti—Mo particulates, the Ti—Mo particulates may tend to agglomerate together. As such, the Ti—Mo particulates may be subjected to a second milling process, in which the second milling process comprises a dry-milling process and the plurality of Ti—Mo particulates after the second milling step may comprise from about 50 microns to about 1275 microns (e.g., about 100 microns to about 200 microns, about 630 microns to about 1015 microns, etc.). In accordance with certain embodiments of the invention, for example, the average size of the plurality of Ti—Mo particulates after the second milling step may comprise from at least about any of the following: 10, 50, 75, 125, 150, 175, 200, 225, 250, 275, 300, 350, 400, 450, 500, 550, 600, 650, 700, 750, 800, 850, 900, 925, and 950 microns and/or at most about 1275, 1250, 1225, 1200, 1175, 1150, 1125, 1100, 1050, 1000, and 950 microns.

In accordance with certain embodiments of the invention, the processes may comprise irradiating a metal molybdenum target to provide the Mo material as discussed herein. The metal molybdenum target, for example, may comprise a tubular capsule comprising metal molybdenum and a plurality of internal metal molybdenum components (e.g., balls, rods, wires, discs, etc.) housed inside of the tubular capsule. For example, the tubular capsule may comprise a first end, a second end, and a wall connecting the first end and the second end to define a hollow cavity therein. In this regard, the plurality of internal metal molybdenum components (e.g., balls, rods, wires, discs, etc.) may be packed within the hollow cavity of the tubular capsule. In accordance with certain embodiments of the invention, at least the first end may be configured to allow access to the hollow cavity for loading and optionally unloading the plurality of internal metal molybdenum components (e.g., balls, rods, wires, discs, etc.). In this regard, at least the first end (or a portion thereon) may be configured to be removed from the tubular capsule to provide access to the hollow cavity. In accordance with certain embodiments of the invention, the metal Mo material in the reacting step comprises the plurality of internal metal molybdenum components, the tubular capsule, or both.

The metal molybdenum target may comprise a plurality of metal molybdenum discs (e.g., circular discs) that each comprise a length, a width, and a thickness in the z-direction. In this regard, the thickness may comprise a value that is less than both the length and width. In accordance with certain embodiments of the invention, the thickness comprises from about 2 microns to about 260 microns (e.g., from about 10 microns to about 150 microns). In accordance with certain embodiments of the invention, for example, the thickness comprise from at least about any of the following: 2, 10, 20, 30, 40, 50, 60, 70, 80, 90, and 100 microns and/or at most about 275, 260, 250, 225, 200, 175, 150, 140, 130, 120, 110, and 100 microns. In accordance with certain embodiments of the invention, the plurality of metal molybdenum discs are packed in a side-by-side relationship in the z-direction inside the tubular capsule. In accordance with certain embodiments of the invention, a plurality of metal molybdenum discs may be used without a capsule. In accordance with certain embodiments of the invention, the metal molybdenum discs may be formed from metal molybdenum sheets by, for example, a stamping process. In accordance with certain embodiments of the invention, the metal Mo material in the reacting step comprises the plurality of metal molybdenum discs, the tubular capsule component, or both.

Figure 2:
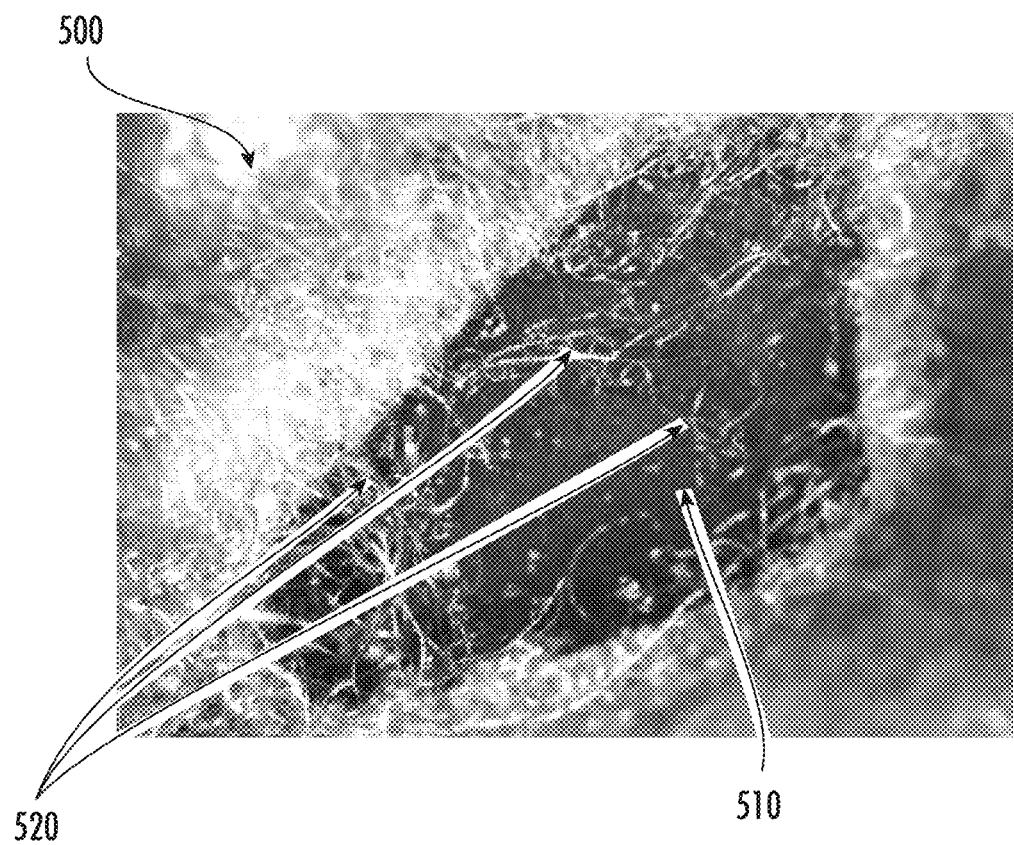
FIG. 2 shows a titanium-molybdate material including several inorganic salt crystals growing on the surface of the titanium-molybdate and outwardly from internal portions or pores of the titanium-molybdate.
Figure 3A:
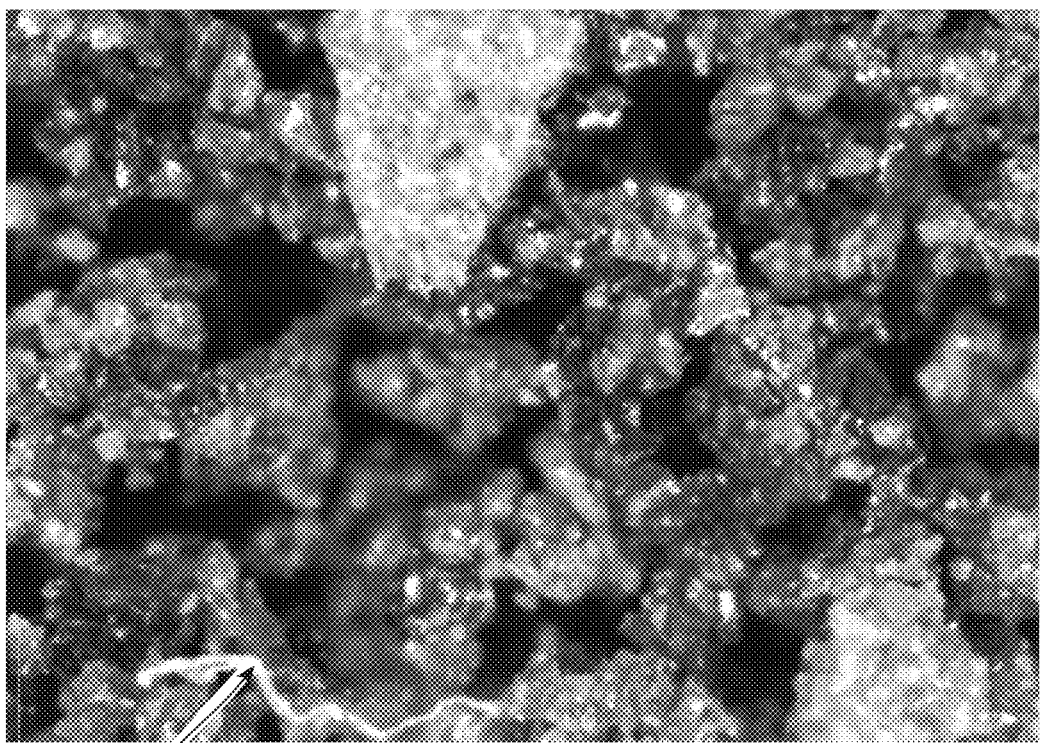
FIG. 3A shows a post-milled and post-washed titanium-molybdate material including a minor amount of remaining inorganic salt crystals.
Figure 3B:
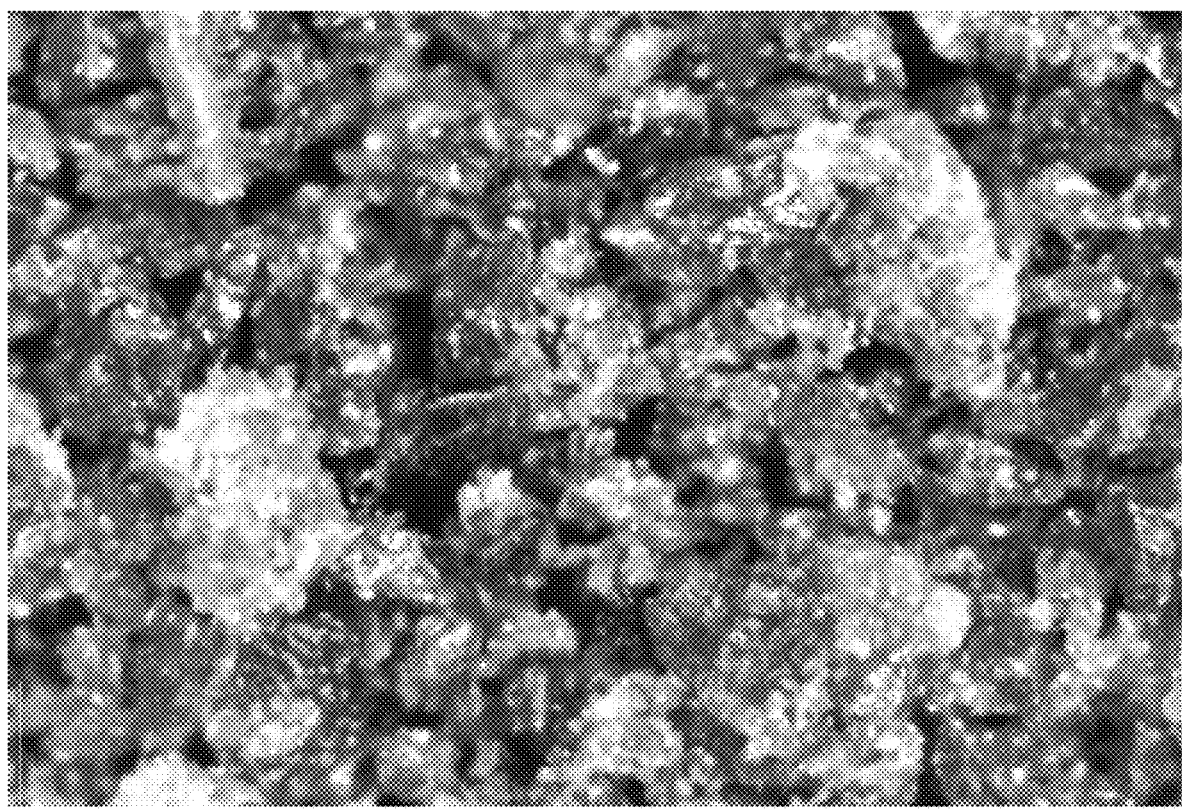
FIG. 3B shows a post-milled and post-washed titanium-molybdate material being devoid of remaining inorganic salt crystals.

FIG. 1 illustrates an example embodiment in accordance with the invention. In particular, FIG. 1 illustrates a process including an optional step (as indicated by the broken lines) of irradiating a metal molybdenum target to provide a metal Mo material at operation 10 prior to reaction of the metal Mo material (e.g., received from operation 10 or alternatively received from a third party) in a liquid medium with at least a first acid to provide a Mo composition at operation 20. As illustrated in FIG. 1, the process includes a step of combining the Mo composition with a titanium source to provide a Ti—Mo composition at operation 30 and pH adjusting the Ti—Mo composition with a base to a pH from about 4 to about 9 and to precipitate a plurality of Ti—Mo particulates at operation 40. As illustrated in the example embodiment of FIG. 1, the Ti—Mo composition may optionally be subjected to a step of cooling the Ti—Mo composition at operation 50 prior to a step of separating the plurality of Ti—Mo particulates from the liquid medium at operation 60. After operation 60, the isolated Ti—Mo particulates can be subjected to a step of exposing the plurality of Ti—Mo particulates to heat energy at operation 70 followed by a step of milling the plurality of Ti—Mo particulates at operation 80. As illustrated by the particular example embodiment of FIG. 1, the process may then include an optional step of washing the plurality of Ti—Mo particulates (e.g., to remove inorganic salts) at operation 90 followed by a second drying step at operation 100. As shown in FIG. 1, the process may include an optional step of re-milling (e.g., dry milling) the post-dried Ti—Mo particulates at operation 110. FIG. 2, for example, shows a shows a titanium-molybdate material 500 including several inorganic salt crystals 520 growing on the surface of the surface of the titanium-molybdate 510 and outwardly from internal portions or pores of the titanium-molybdate. In this regard, the washing step at operation 90 may dissolve and/or remove a vast majority (or substantially all) of the inorganic salt crystals 520 shown in FIG. 2. FIG. 3A, for instance, shows a post-milled and post-washed titanium-molybdate material including a minor amount of remaining inorganic salt crystals 520 while FIG. 3B shows a post-milled and post-washed titanium-molybdate material being devoid (or substantially devoid) of remaining inorganic salt crystals.

Figure 4:
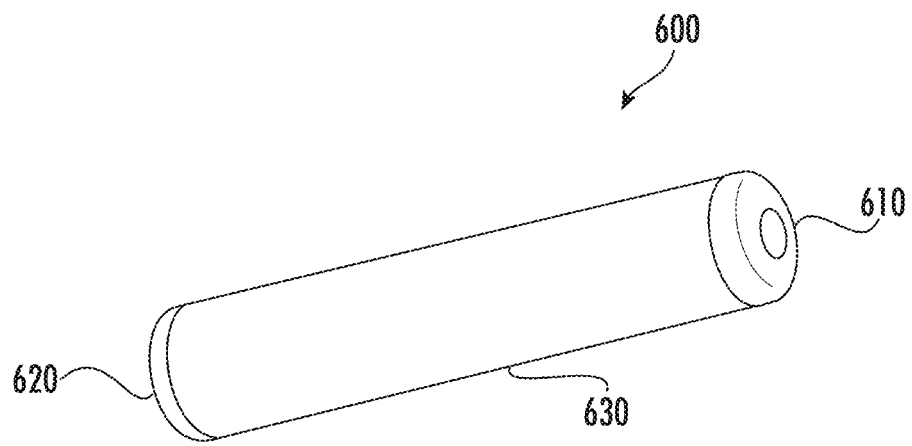
FIG. 4 illustrates a metal molybdate target for irradiating to provide a Mo material according to one embodiment of the invention.
Figure 5:
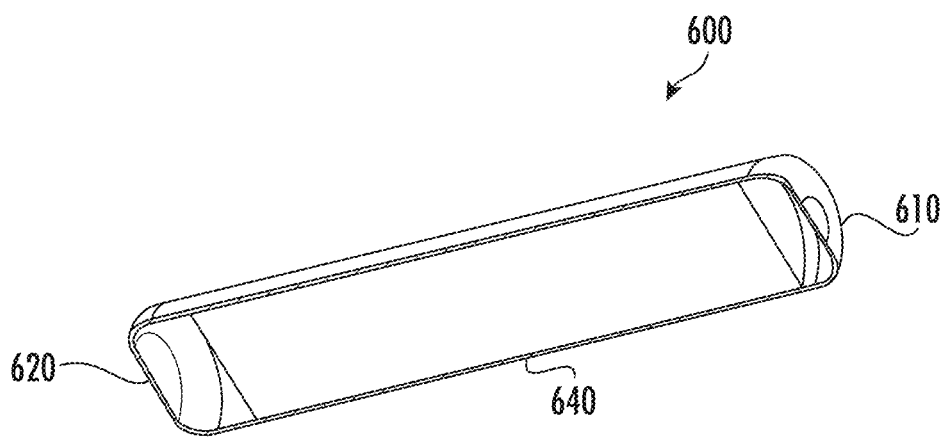
FIG. 5 illustrates a cross-sectional view of a metal molybdate target illustrated by FIG. 4.

As noted above, the metal molybdenum target that may be irradiated to provide the Mo material may comprise a tubular capsule and/or a plurality of metal molybdenum components (e.g., balls, rods, wires, discs, etc). FIG. 4, for example, illustrates a tubular capsule 600 comprising a first end 610, a second end 620, and a wall 630 connecting the first end and the second end to define a hollow cavity (illustrated in FIG. 5) therein. FIG. 5 illustrates a cross-sectional view of the tubular capsule 600 illustrated by FIG. 4 and shows the hollow cavity 640. In this regard, the plurality of internal metal molybdenum components (e.g., balls, rods, wires, discs, etc.) may be packed within the hollow cavity of the tubular capsule.

The metal molybdenum target, according to certain embodiments of the invention, may be irradiated, for example, by neutron capture in a fission reactor. In accordance with certain embodiments of the invention, the Mo material as disclosed herein may be provided by a variety of Mo production technologies including, for example, fission reactors (e.g., reprocessed uranium, low-enriched uranium, and highly enriched uranium), particle accelerators, and neutron capture. In accordance with certain embodiments of the invention, the metal molybdenum target may be irradiated by any type of reactor in which the Mo target can be inserted. Non-limiting examples of reactors include, but are not limited to, High Flux Isotope Reactor (HFIR), a CANDU reactor (e.g., CANDU reactor, CANDU6 reactor, CANDU9 reactor, Advanced CANDU reactor (ACR), etc.). Other non-limiting examples of reactors are power reactors and research reactors including, but not limited to, University of Missouri Research Reactor (MURR), National Institute of Standards and Technology (NIST) Reactor, MIT Nuclear Research Reactor (MITR), and Advanced Test Reactor (ATR).

In this regard, the origin of the Mo material as disclosed herein is not particularly limited in accordance with certain embodiments of the invention.

In yet another aspect, the invention provides a Ti—Mo material comprising a plurality of Ti—Mo particulates comprising a porous structure including a plurality of pores, channels, or both. In this regard, one or more of the plurality Ti—Mo particulates may independently comprise a porous structure (e.g., porous matrix defined by an individual Ti—Mo particle) including a plurality of pores, channels, or both. The Ti—Mo material, in accordance with certain embodiments of the invention, may further comprise one or more inorganic salts (e.g., ammonium chloride, ammonium nitrate, and/or ammonium hydroxide), in which at least a portion of the one or more inorganic salts may be disposed within the pores and/or channels of the porous structure (e.g., porous matrix defined by an individual Ti—Mo particle). In this regard, such embodiments of the invention may in some instances comprise an intermediate product for further processing if so desired. In accordance with certain embodiments of the invention, for example, the average size of the plurality of Ti—Mo particulates may comprise from at least about any of the following: 10, 50, 75, 100, 125, 150, 175, 200, 225, 250, 275, 300, 350, 400, 450, 500, 550, 600, 650, 700, 750, 800, 850, 900, 925, and 950 microns and/or at most about 1275, 1250, 1225, 1200, 1175, 1150, 1125, 1100, 1050, 1000, and 950 microns.

In yet another aspect, the invention provides a Ti—Mo material comprising a plurality Ti—Mo particulates, in which one or more of the Ti—Mo particulates comprise a porous structure including a plurality of pores, channels, or both. In accordance with certain embodiments of the invention, the Ti—Mo material comprises an eluting efficiency of 30% or greater, an eluting efficiency of 80% or greater, 90% or greater, or 95% or greater. The Ti—Mo material, in accordance with certain embodiments of the invention, may be disposed in an elution column to provide a technetium-99m generator and at least 90% (e.g., at least 95% or at least 99%) of a total technetium content releases from the Ti—Mo material via passing an aqueous liquid (e.g., water, saline, dilute acid) through the Ti—Mo material. In this regard, certain embodiments of the invention enable the use of larger elution columns (e.g., technetium-99m generators). For instance, the standard 20 milliliter saline eluting may extract technetium from elution columns much larger than the standard 3 milliliter elution column size. Accordingly, certain embodiments of the invention enable achievement of target Tc-99m activities from smaller than expected Mo activities. Consequently, reactors with lower fluxes may be used to provide commercially viable product to the industry and a greater number of reactors may participate in suitable Mo generation.

In this regard, certain embodiments of the invention enable use of elution columns (e.g., technetium-99m generators) exceeding the standard 3 milliliter size (e.g., 5 mL, 10 mL, 12 mL, 15 mL, 20 mL, 25 mL, 30 mL, 60 mL, or 100 mL) such that the use of reactors with smaller fluxes to produce the desired target technetium activity are now viable. For example, lower flux reactors that traditionally could not be utilized for generating a high enough specific activity of technetium for commercial purposes may now be viably utilized in accordance with certain embodiments of the invention. In this regard, a variety of reactors may be used to supply Mo to processes in accordance with certain embodiments of the invention.

As noted above, Ti—Mo materials in accordance with certain embodiments of the invention enable the use of elution columns exceeding the standard 3 milliliter size (e.g., 5 mL, 10 mL, 12 mL, 15 mL, 20 mL, 25 mL, 30 mL, 60 mL, or 100 mL) such that the use of reactors with smaller fluxes to produce the desired target technetium activity are now viable. Accordingly, the present invention also provides an elution pig configured to accept a variety of sizes of elution columns which will allow a variety of reactors (e.g. reactors of high flux and/or low flux) to be integrated into the supply chain for the production of Tc-99m. In accordance with certain embodiments of the invention, the elution pig may be configured to accept a variety of different sized elution columns including 3 mL, 5 mL, 10 mL, 12 mL, 15 mL, 20 mL, 25 mL, 30 mL, 60 mL, 100 mL or any combination thereof.

Figure 6:
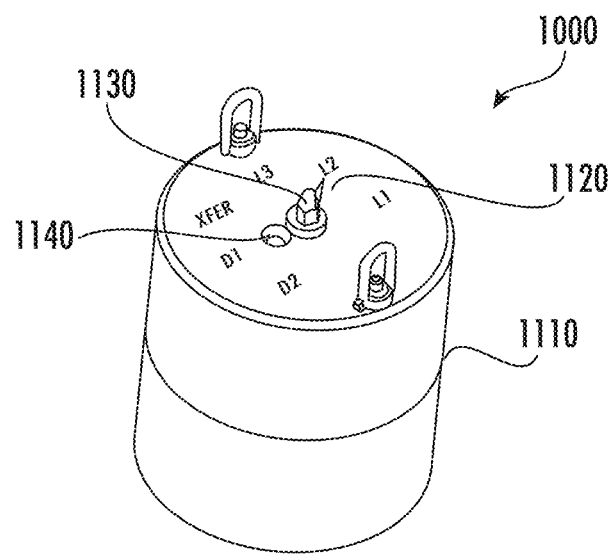
FIG. 6 illustrates a cask transfer case according to one embodiment of the invention.
Figure 7:
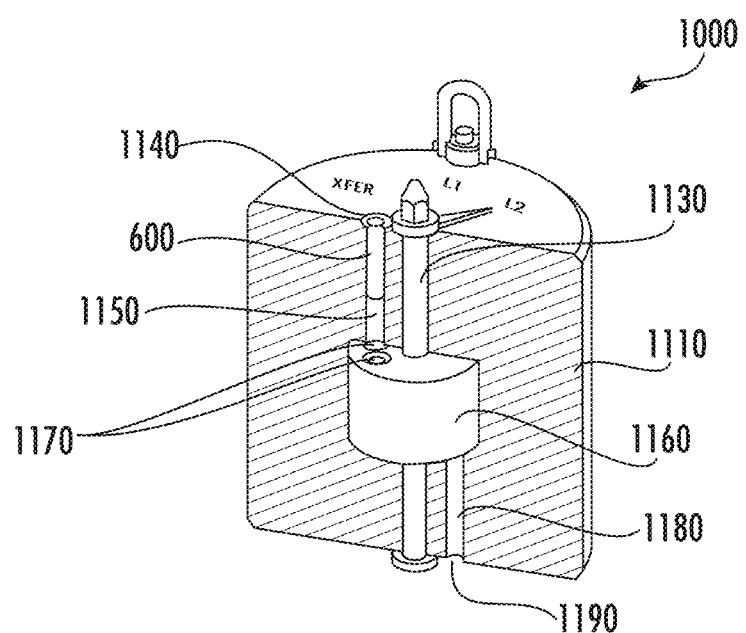
FIG. 7 illustrates a cross-sectional view of the cask transfer case illustrated in FIG. 6.

In yet another aspect, the present invention provides a cask transfer case and process. In order to move the highly radioactive Mo material from the reactor to the location for chemical processing (e.g., addition to titanium source, etc.), certain embodiments of the invention provide a cask transfer case that may shield personnel from undesirable doses of radioactivity. The cask transfer case may also allow for safe loading of the Mo material and transfer of the Mo material from the reactor pool to the chemical processing location as well as unloading of the Mo material. FIG. 6, for instance, illustrates an example embodiment of a cask transfer case 1000 including a housing (e.g., including lead) 1110 and a dial 1120 attached to a rotating shaft 1130 that extends at least partially through the body of the housing. As showing in FIG. 6, the dial 1120 may be rotated to indicate an operating condition of the cask transfer case 1000. As shown in FIG. 6, for example, "L1" indicates that the cask transfer case is in an operating condition for loading a radioactive material into a first location, as discussed in greater detail below, via material inlet port 1140. As shown in FIG. 6, the cask transfer case 1000 includes a plurality of loading locations (e.g., "L1", L2", and "L3"). For instance, FIG. 7 is a cross-sectional view of FIG. 6 and illustrates the internal configuration of a cask transfer case 1000 according to certain embodiments of the invention. As shown in FIG. 7, the material inlet port 1140 is operatively connected to inlet conduit 1150. FIG. 7, for instance, illustrates a radioactive Mo material 600 inserted through the inlet port 1140 and into the inlet conduit 1150. As shown in FIG. 7, the rotating shaft 1130 is attached to an internal conduit housing 1160 that defines one or more internal conduits 1170 defined by the internal conduit housing. In this regard, the one or more internal conduits 1170 extend throughout the entire length of the internal conduit housing 1160. In this regard, the length of the one or more internal conduits 1170 comprise a length greater than a length of material (e.g., radioactive Mo material 600) loaded therein such that the internal conduit housing may be freely rotated about the axis of the rotating shaft 1130. In accordance with certain embodiments of the invention, one of the internal conduits 1170 may be aligned with the inlet conduit 1150 when the dial 1120 is positioned to indicate loading of a material. As such, a material (e.g., radioactive Mo material 600) to be loaded into the cask transfer case 1000 may be inserted through the inlet port 1140 and travel through the inlet conduit 1150 and rest inside an aligned internal conduit 1170 (e.g., the bottom of the loaded material may rest on an underlying internal portion of the housing 1110 and confined by the internal conduit 1170). As shown in FIG. 7, the housing 1110 also includes an exit conduit 1180 located underneath the internal conduit housing 1160 such that a material loaded in the cask transfer case may be dropped or released from the internal conduit 1170 when the dial is positioned to indicate an operation condition of dropping material (e.g., "D1", D2", and "D3" of FIG. 7). In such an operating condition, an internal conduit 1170 may be aligned with the exit conduit 1180 such that the loaded material drops out of the internal conduit, passes through the exit conduit, and exits the cask transfer case 100 through exit port 1190. As illustrated by FIG. 6, the cask transfer case may comprise an operating condition indicating the cask transfer case is ready for being transferred (e.g., "XFER" in FIG. 7) or relocated without risk of any material loaded therein from exiting through either the inlet port 1140 or the exit port 1190. For example, when the cask transfer cask 1000 is in the transfer operating condition according to certain embodiments of the invention, none of the internal conduits 1170 are aligned with the inlet conduit 1150 or the exit conduit 1180. That is, the inlet conduit 1150 is note aligned with any of the internal conduits 1170 and/or the exit conduit 1180 is not aligned with any of the internal conduits 1170. In this regard, the cask transfer cask 1000 would be safe to relocated to transfer radioactive material disposed therein.

In accordance with certain embodiments of the invention, the Ti—Mo material comprising a plurality Ti—Mo particulates may be irradiated prior to being loaded into a cask transfer case or an elution column. This post-irradiation step can eliminate the optional step of irradiating a metal molybdenum target at the front end of the process. Among the advantages of such a post-irradiation process step are that the chemical process can be performed without radiological control thereby reducing or eliminating radioactive waste generation, and that there is a decrease in processing time resulting in higher initial activity of the metal-Mo particles.

Figure 8:
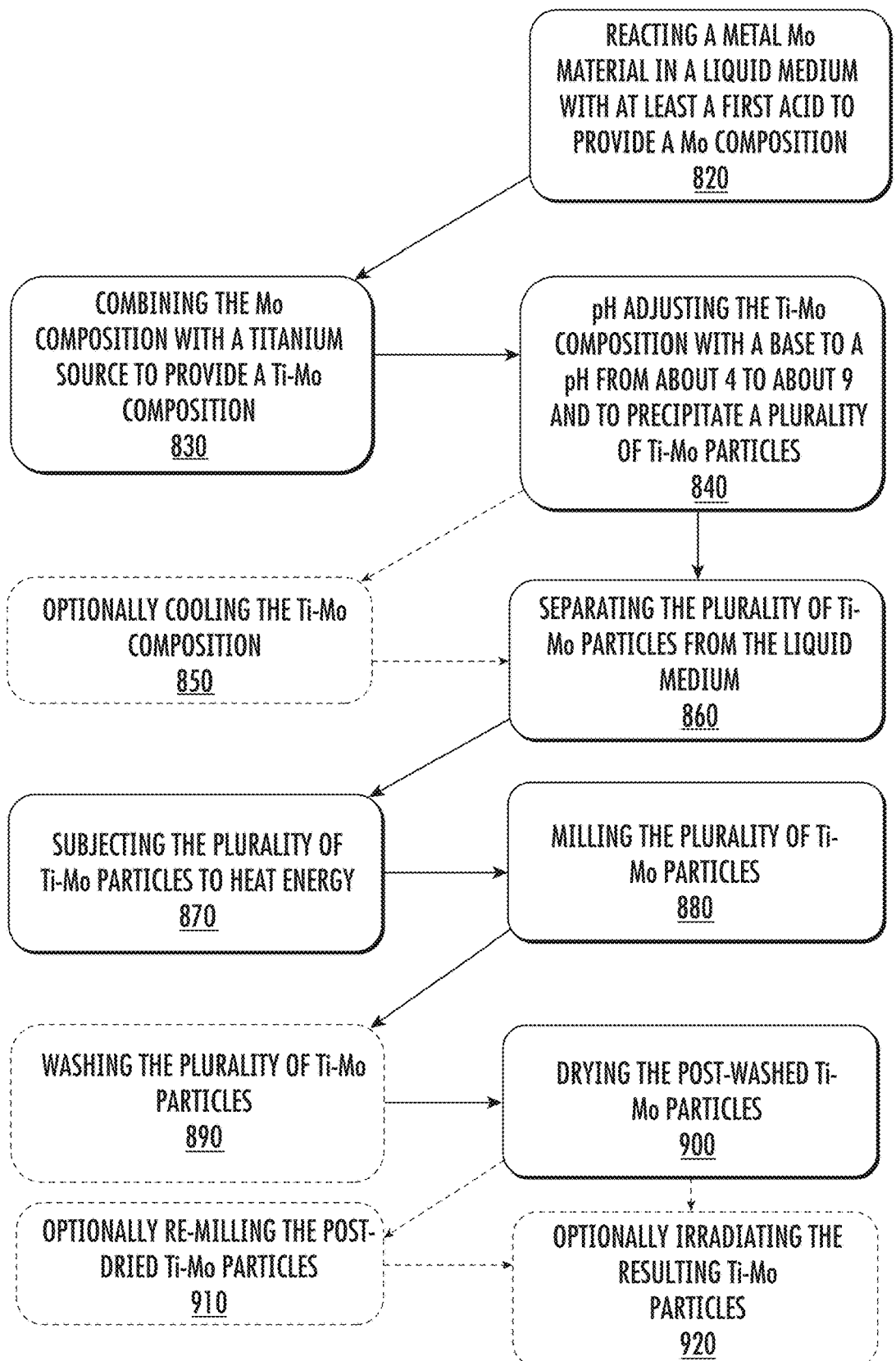
FIG. 8 is a block diagram of a process for producing a titanium-molybdate material according to an embodiment of the invention.

Referring to the figures, FIG. 8 is a block diagram of a process for producing a titanium-molybdate material. FIG. 8 illustrates post-irradiation in accordance with the invention. As illustrated in FIG. 8, the process includes step 820 of reacting a metal Mo material in a liquid medium with at least a first acid to provide a Mo composition. In step 830, the process includes combining the Mo composition with a titanium source to provide a Ti—Mo composition and pH adjusting the Ti—Mo composition with a base to a pH from about 4 to about 9 and to precipitate a plurality of Ti—Mo particles in step 840. As illustrated in the example embodiment of FIG. 8, the Ti—Mo composition may optionally be subjected to step 850 of cooling the Ti—Mo composition prior to step 860 of separating the plurality of Ti—Mo particles from the liquid medium. After step 860, the isolated Ti—Mo particles can be subjected to a step 870 of exposing the plurality of Ti—Mo particles to heat energy followed by a step 880 of milling the plurality of Ti—Mo particles. As illustrated by the particular example embodiment of FIG. 8, the process may then include an optional step 890 of washing the plurality of Ti—Mo particles followed by a second drying step 900. As shown in FIG. 8, the process may include an optional step 910 of re-milling (e.g., dry milling) the post-dried Ti—Mo particles. As illustrated by the particular example embodiment of FIG. 8, the process may then include an optional step 920 of irradiating the resulting Ti—Mo particles prior to being loaded in an elution column.

These and other modifications and variations to the invention may be practiced by those of ordinary skill in the art without departing from the spirit and scope of the invention, which is more particularly set forth in the appended claims. In addition, it should be understood that aspects of the various embodiments may be interchanged in whole or in part. Furthermore, those of ordinary skill in the art will appreciate that the foregoing description is by way of example only, and it is not intended to limit the invention as further described in such appended claims. Therefore, the spirit and scope of the appended claims should not be limited to the exemplary description of the versions contained herein.

That which is claimed:

1. A titanium-molybdate (Ti—Mo) material, comprising:
    a plurality of Ti—Mo particulates comprising a structure including a plurality of pores, channels, or both; and
    one or more inorganic salts present in the structure, wherein an average size of the plurality of Ti—Mo particulates is in a range of from about 630 microns to about 1015 microns.

2. The titanium-molybdate (Ti—Mo) material of claim 1, wherein the one or more inorganic salts comprise ammonium nitrate.

3. The titanium-molybdate (Ti—Mo) material of claim 1, wherein the one or more inorganic salts are selected from the group consisting of ammonium chloride, ammonium nitrate, ammonium hydroxide, and a combination thereof.

4. The titanium-molybdate (Ti—Mo) material of claim 1, wherein the Ti—Mo material comprises an eluting efficiency of 30% or greater.

5. The titanium-molybdate (Ti—Mo) material of claim 4, wherein the Ti—Mo material comprises an eluting efficiency of 70% or greater.

6. The titanium-molybdate (Ti—Mo) material of claim 5, wherein the Ti—Mo material comprises an eluting efficiency of 80% or greater.

7. The titanium-molybdate (Ti—Mo) material of claim 1, wherein the Ti—Mo material is disposed in an elution column, and at least 90% of a total technetium content is released from the Ti—Mo material via passing an aqueous liquid through the Ti—Mo material.

8. The titanium-molybdate (Ti—Mo) material of claim 7, wherein the aqueous liquid is selected from the group consisting of water, saline, dilute acid, and a combination thereof.

9. A cask transfer case comprising the titanium-molybdate (Ti—Mo) material of claim 1.

10. A system for production of technetium comprising an elution column having a volume of at least 3 mL and the titanium-molybdate (Ti—Mo) material of claim 1.

11. The system according to claim 10, wherein the elution column has a volume of greater than 3 mL.

* * * * *